United States Patent [19]

Van Der Hoek

[11] 4,390,238

[45] Jun. 28, 1983

[54] OPTICAL TELECOMMUNICATION ELEMENT, METHOD OF MANUFACTURING SAME, AND OPTICAL TELECOMMUNICATION CABLE COMPRISING THE ELEMENT

[75] Inventor: Willem Van Der Hoek, Eindhoven, Netherlands

[73] Assignee: U.S. Philips Corporation, New York, N.Y.

[21] Appl. No.: 208,619

[22] Filed: Nov. 20, 1980

[30] Foreign Application Priority Data

Dec. 13, 1979 [NL] Netherlands ............... 7908966

[51] Int. Cl.³ ............................................. G02B 5/14
[52] U.S. Cl. ............................................. 350/96.23
[58] Field of Search .................................. 350/96.23

[56] References Cited

U.S. PATENT DOCUMENTS

| | | | |
|---|---|---|---|
| 3,697,395 | 10/1972 | Kehr et al. | 204/159 |
| 3,697,397 | 10/1972 | Kehr et al. | 204/159 |
| 4,008,341 | 2/1977 | Kehr | 427/44 |
| 4,037,922 | 7/1977 | Claypoole | 350/96.23 |
| 4,169,657 | 10/1979 | Bedard | 350/96.23 |
| 4,275,091 | 6/1981 | Lippits et al. | 427/53 |
| 4,331,378 | 5/1982 | Hartig | 350/96.23 |

FOREIGN PATENT DOCUMENTS 2724155 12/1978 Fed. Rep. of Germany .
1486227 9/1977 United Kingdom .

*Primary Examiner*—John D. Lee
*Attorney, Agent, or Firm*—Marc D. Schechter

[57] ABSTRACT

An optical telecommunication element which is constructed from a central optical fiber which is under an axial pressure and which is incorporated in a close-fitting sheath of supporting fibers having a modulus of elasticity which is at least 4000 kg/mm². The optical fiber is fixed within the sheath by a layer of cured lacquer.

11 Claims, 3 Drawing Figures

OPTICAL TELECOMMUNICATION ELEMENT, METHOD OF MANUFACTURING SAME, AND OPTICAL TELECOMMUNICATION CABLE COMPRISING THE ELEMENT

BACKGROUND OF THE INVENTION

The invention relates to an optical telecommunication element having a central optical fiber which is incorporated, under axial pressure, in a layer of a synthetic resin. The layer of synthetic resin is provided with reinforcement wires.

Such an element is known from German Offenlegungsschrift No. 2724155, page 6, second paragraph. According to the Offenlegungsschrift, a jacket of thermoplastic synthetic resin is provided around the optical fiber by means of an extrusion process. Upon cooling of the extruded jacket, shrinkage occurs so that the enclosed optical fiber comes under an axial pressure. The plastic synthetic resin must have a high modulus of elasticity so as to reduce lateral bending of the optical fiber under shrinkage of the synthetic resin.

The axial compression of the optical fiber according to the Offenlegungsschrift can be increased by extruding a few prestressed wires together with the synthetic resin. It is also possible to provide the prestressed wires on the fiber already provided with an extruded jacket of synthetic resin.

SUMMARY OF THE INVENTION

It is an object of the present invention to provide an optical telecommunication element of the type described above in which the optical fiber processed therein is under a high axial pressure and is protected from both internally and externally occurring forces. In this connection, the optical telecommunication element, after having been processed to form a cable, must be able to withstand large external forces occurring during or after laying the cable. For example, it must be able to withstand the bending force exerted on the cable when an operator laying the cable steps on the cable.

Furthermore, the optical fiber must be capable of being centered optimally in the telecommunication element. This is achieved by minimizing the eccentricity of the optical fiber relative to the pressure line in the element so that there are no harmful bends, with comparatively small radii of curvature, in the optical fiber under axial pressure.

Another object of the invention is to provide an optical telecommunication element which can more satisfactorily withstand temperature variations and moisture and which can furthermore be manufactured in a continuous process in an attractive manner.

According to the invention these objects are achieved by incorporating the optical fiber in a close-fitting sheath of fibers having a minimum modulus of elasticity of 4000 kg/mm². A cured layer of lacquer is present within the sheath to fix the optical fiber axially therein.

The sheath of fibers forms a harness or an armor for the central optical fiber. The inside of the sheath either bears substantially against the optical fiber or is present at a small distance from the optical fiber. A distance of 10–500 μm may be present, preferably a distance of 20–200 μm.

The space between the optical fiber and the sheath as well as the space between the various sheath fibers is filled with the cured lacquer. As a result of this, the position of the optical fiber within the sheath is fixed readily and permanently, and furthermore the cohesion between the sheath fibers and hence the armoring of the optical fiber is intensified.

The cured lacquer has a network structure in which cross-links exist between the molecules. The lacquer is only slightly sensitive to temperature and moisture. Furthermore, in the element according to the invention only a small quantity of lacquer is used.

The element is manufactured by using a method in which the fibers which are under a tensile stress (these fibers having an elasticity modulus of at least 4000 kg/mm²) are combined to form a sheath, and an optical fiber is inserted centrally in the sheath. The space within the sheath is provided with a curable lacquer having a maximum viscosity of 50 cP, the lacquer is then cured and the tensile stress is finally removed. As a result, the central optical fiber comes under an axial compressive stress due to the associated shrinkage of the sheath fibers.

According to this process, the ultimate axial compression of the optical fiber is not produced by the lacquer but exclusively by the sheath fibers which are under a tensile stress.

The forces released upon removing the tensile stress are transmitted via the thin cured layer of lacquer to the optical fiber which comes under axial pressure. The magnitude of the axial fiber pressure is determined in particular by the magnitude of the tensile stress exerted on the sheath fibers and the diameters of the optical fiber, the sheath fibers, and the telecommunication element. With the diameters remaining constant, the magnitude of the axial pressure on the optical fiber can be adjusted by variation of the tensile stress.

For example, an optical fiber having a diameter of 125 μm provided in a telecommunication element according to the invention having a diameter of 800 μm, can be subjected to an axial compression of 15 N by exerting a pulling force of 400 N on the bundle of glass sheath fibers, each having a diameter of 100 μm. For example, if the sheath of the element has 40 fibers, there is an average pulling force of 10 N due to each sheath fiber. It is not necessary that the same pulling force is exerted on each sheath fiber. For example, a force of 12 N can be exerted on the fibers situated more toward the outside of the sheath, and a force of 8 N can be exerted on the sheath fibers situated more toward the interior. The above-mentioned axial pressure force of 15 N on the optical fiber means the optical fiber will be compressed on the order of magnitude of 2%.

In this connection reference is made to British Pat. Specification No. 1,486,227 in which an optical telecommunication element is described which is manufactured by providing an optical fiber with a thermoplastic sheath by an extrusion process. Together with the synthetic resin, a few steel wires or polyamide fibers which are under a tensile stress are also passed through the extrusion head. By subsequently relaxing the wires or fibers a 1% shrinkage is obtained, which leads to a 1% excess length of the optical fiber which is embedded helically in the synthetic resin sheath. The helical fiber which is not under stress has little resistance to external and internal forces.

In the element according to the invention in which the optical fiber is incorporated in a thin cured lacquer layer in a close-fitting sheath of fibers, there is essentially no increase in length or curvature of the optical fiber which, as already stated, is under a high axial pressure.

In a favorable embodiment of the method according to the invention, the optical fiber and the sheath fibers, which are arranged regularly around the optical fiber and which are under a tensile stress, are passed continuously through a reservoir having an inlet and an outlet. The reservoir contains a curable lacquer. The sheath of fibers, formed near or in the inlet, together with the optical fiber centered in the sheath and the lacquer present in the sheath leave the reservoir via the outlet. The inside diameter of the outlet corresponds to the outside diameter of the sheath. The lacquer is then cured and the tensile stress applied to the sheath fibers is removed.

Suitable sheath fibers having a modulus of elasticity which exceeds the above-mentioned minimum value of 4000 kg/mm$^2$ are, inter alia, boron fibers, graphite fibers and glass fibers. Particularly suitable are the electrically nonconductive glass fibers having a modulus of elasticity of 7350 kg/mm$^2$.

The diameters of the sheath fibers used are not restricted to narrow limits. They are preferably 50-250 μm. Each sheath fiber may consist of a single wire or it may be a bundle of wires. Also the optical fiber may be a single fiber or a bundle of fibers.

In a further favorable embodiment of the process according to the invention fibers are used which during the passage through the reservoir are arranged around the optical fibers in several funnel-like shells. The axes of the funnel-like shells coincide, although the shells have different apical angles.

The tensile stress used is preferably such that the fibers are elongated by 1-5%.

The lacquer process used in the method according to the invention is carried out with a thin liquid lacquer. The lacquer which is dragged along through the outlet of the reservoir by the optical fiber and sheath fibers exerts no or only small transverse forces on the optical fiber. Transverse forces are to be understood to mean herein forces which are at right angles to the longitudinal direction of the optical fiber. The centering of the optical fiber within the sheath is hence not adversely influenced. It is to be noted that in an extrusion process as used in the manufacture of the above-described known optical telecommunication elements, comparatively strong transverse forces occur which give rise to a variable noncentric position of the rather fragile optical fiber in the synthetic resin sheath. As a result of the shrinkage occurring upon cooling the sheath, when the pressure line does not coincide with the position of the optical fiber, unequal forces will act on the optical fiber which may lead to undesired bends with comparatively small radii of curvature.

The lacquer used in the method according to the invention after curing need not adhere to the optical fiber and/or the sheath fibers. It has been found that the friction between fibers and cured lacquers is sufficient to transmit the released tensile stress of the sheath fibers to the optical fiber and to bring and maintain the latter under an axial pressure.

The lacquer may be a thermocuring lacquer, for example, an epoxy lacquer which, if desired, can be brought to the desire degree of viscosity of at most 50 cP by the addition of solvents.

The use of a thin-liquid lacquer (at most 50 cP) which does not comprise solvents and which can be cured with light, in particular ultraviolet light, is to be preferred. These light-curing lacquers are commercially available. Suitable lacquers are those which comprise low molecular monomers based on acrylic acid esters, as well as a photosensitive catalyst. A suitable catalyst is an aromatic carbonyl compound, in particular a benzoin derivative, such as benzoin isobutyl ether. The light-curable lacquer comprises more in particular a mixture of mono-, di-, tri-, or tetra-esters of acrylic acid. Examples of readily useful esters of acrylic acid as well as the lacquers based hereon are disclosed, inter alia, in U.S. Pat. No. 4,275,091 (same as Netherlands Patent Application 7611395). Other readily useful lacquers are the commercially available polythiol-polythene lacquers which are described, inter alia, in U.S. Pat. Nos. 3,697,395 to 3,697,397 and 4,008,341.

The light-curable lacquer used in the method according to the invention can be cured by exposing the lacquer to light via the sheath of fibers. In that case fibers must be used which are light-pervious, such as glass fibers. The curing can be carried out at ambient temperature. The exposure time depends on the composition of the lacquer, in particular on the content of photosensitive catalyst which usually is approximately 0.5-4% by weight, and varies from a few seconds to a few minutes. In a most simple but quite interesting embodiment the sheath is composed of a single layer of sheath fibers, such as a single layer of six sheath fibers which substantially bear against each other and have a diameter of, for example, 200 μm. The lacquer layer between the sheath and the central optical fiber with a diameter of 125 μm, has a thickness of 37.5 μm.

In a further favorable embodiment of the optical telecommunication element according to the invention, the sheath is constructed from concentric shells of sheath fibers. The fibers in the sheath occupy at least 70% of the volume of the sheath.

Particularly favorable is an embodiment in which the sheath fibers occupy 80-88% of the sheath volume. With such a large "space factor" a high mechanical rigidity is obtained, while minimizing the quantity of lacquer between the fibers of the sheath. This means that during the manufacture of the sheath the lacquer can rapidly be cured and only a short exposure time is necessary. Moreover, with a small quantity of lacquer the forces which are exerted on the fibers upon shrinkage or expansion of the lacquer are comparatively small.

In another favorable and more specific embodiment of the invention in which a strong telecommunication element is obtained, the sheath is constructed from at least two concentric shells in which each sheath fiber bears or substantially bears against the sheath fibers in the same shell situated on either side as well as against the adjoining sheath fibers in the preceding and/or subsequent shell.

This last embodiment applies in particular to an element in which the sheath is contructed from a first (inner) shell of 6-8 fibers each having a diameter of 50-250 μm, a second shell of 12-15 fibers having a diameter of 50-250 μm, and if desired a third shell of 18-22 fibers having a diameter of 50-250 μm.

As already noted hereinbefore the value of the axial pressure force on the optical fiber can be adjusted in a simple manner. An element suitable for practical application and capable of absorbing large external forces comprises an optical fiber which is under an axial compression of 5-70 N. Good results are obtained in particular with an element having an optical fiber under a compressive force of 10–50 N.

The invention also relates to an optical telecommunication cable which comprises one or more of the telecommunication elements as well as an outer sheath of synthetic resin.

The optical telecommunication cable may be manufactured in a simple manner by combining one or several telecommunication elements with a sheath of synthetic resin. It is to be recommended to incorporate a strong armoring, for example a steel armoring, in the sheath of synthetic resin.

For example, a flat cable can be manufactured by enveloping one or several (for example 2 or 3) layers of parallel telecommunication elements with synthetic resin. A steel wire may be incorporated in the sheath of synthetic resin on either side of the layer or layers of elements.

A round cable can be obtained by twisting a large number of optical telecommunication elements around a steel wire core and providing the assembly with an extruded sheath of synthetic resin. Instead of steel an armoring of twined fibers, for example, glass fibers, may also be used.

DESCRIPTION OF THE PREFERRED EMBODIMENTS

Figure 1:
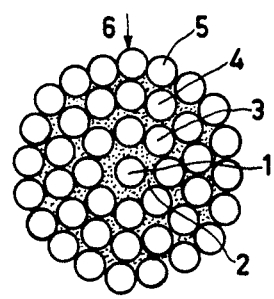
FIG. 1 is a cross-sectional view of a telecommunication element according to the invention.

Reference number 1 in FIG. 1 denotes an optical fiber having a diameter of 125 μm. Optical fiber 1 is embedded in a layer 2 of a light-cured lacquer having a thickness of 50 μm. The lacquer layer 2 is surrounded by a first shell 3 of eight glass fibers each having a diameter of 100 μm. First shell 3 is surrounded by a second shell 4 of fourteen glass fibers also having a diameter of 100 μm, which in turn is surrounded by a third shell 5 of twenty glass fibers also having a diameter of 100 μm. The shells 3, 4 and 5 together constitute a sheath denoted by arrow 6. The glass fibers in sheath 6 occupy 85% of the sheath volume. The remaining 15% of the sheath volume is occupied by the cured lacquer present between the glass fibers.

Figure 2:
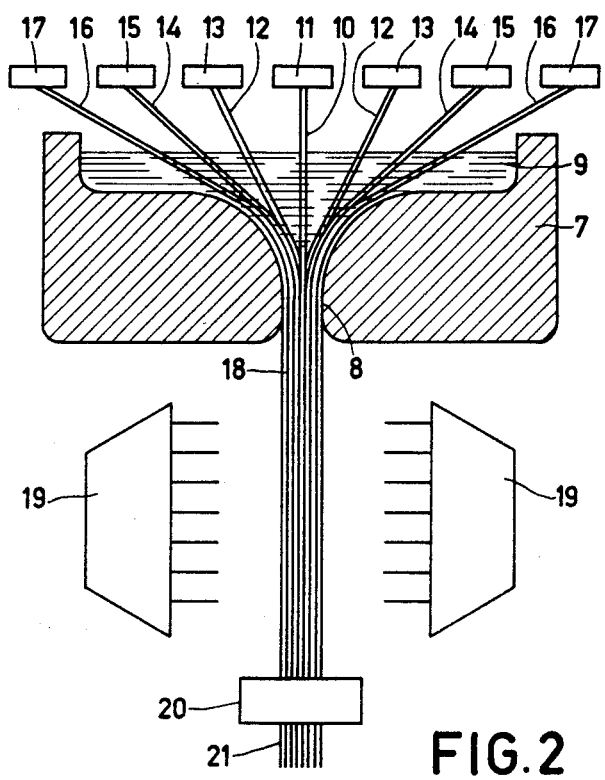
FIG. 2 is a cross-sectional view, partly schematic, of a device for manufacturing the element according to the invention.

Reference numeral 7 in FIG. 2 denotes a reservoir having a substantially conical outlet 8 the smallest diameter of which is approximately 800 μm. Reservoir 7 is filled with a low viscosity, light-curable lacquer 9 which has a viscosity of approximately 5 cP and has the following composition:
- 21.5% by weight of etheylhexylacrylate
- 78.0% by weight of butanedioldiacrylate
- 0.5% by weight of benzyldimethylketal (initiator).

An optical fiber having a thickness of 125 μm is passed centrally through the reservoir 7. Optical fiber 10 is unwound freely from a nonbraked supply reel 11. A first bundle of eight glass fibers 12, each having a diameter of 100 μm, is also passed through reservoir 7. The bundle is funnel-shaped, the individual glass fibers 12 being distributed regularly over the surface of the funnel and opening into the outlet 8 of reservoir 7. The optical fiber 10 is passed along the axis of the funnel through reservoir 7. The glass fibers 12 are unwound from braked supply reels 13, the braking force on each reel being 10 N.

A second bundle of fourteen fibers each having a diameter of 100 μm passes through the reservoir 7 from the surface of the lacquer 9 present in the reservoir down to the outlet 8. The bundle is also funnel-shaped, the axis of the second funnel coinciding with that of the first funnel. However, the apical angle of the second funnel is larger than that of the first. The fourteen glass fibers 14 are distributed regularly over the surface of the second funnel. Glass fibers 14 are unwound from braked supply reels 15, the braking force on the reels being approximately 11 N.

A third funnel-shaped bundle of 20 glass fibers 16, each having a diameter of 100 μm, also passes through reservoir 7. Fibers 16 are unwound from braked supply reels 17. The braking force on reels 17 is 12 N. The fibers 16 are distributed regularly over the surface of the third funnel, the axis of which coincides with that of the above-mentioned first and second funnels. The apical angle of the third funnel is larger than that of the second funnel.

The assembly of optical fibers 10 and glass fibers 12, 14 and 16 leaves the reservoir 7 via the outlet 8. The glass fibers 12, 14 and 16 constitute a sheath for the central optical fiber 10. The lacquer present between the fibers of the sheath as well as the lacquer present between the sheath and optical fiber 10 is also taken out of the reservoir 7.

The assembly 18 provided with lacquer is then exposed to ultraviolet light originating from light sources 19, in order to cure the lacquer. The resulting assembly is taken up by a winding head 20 with a pulling force of 460 N. After releasing the telecommunication element 21 the glass fibers 12, 14 and 16 relax, the glass fiber 10 being axially compressed with a force of 17 N. This is a 2% compression.

Figure 3:
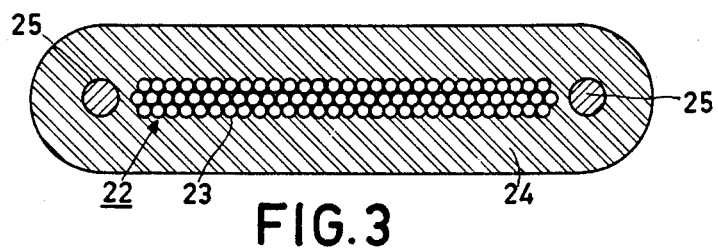
FIG. 3 is a cross-sectional view of an optical telecommunication cable according to the invention.

Reference numeral 22 in FIG. 3 denotes three layers of 29-30 parallelly arranged optical telecommunication elements 23. The individual elements 23 are manufactured in the above-described manner with reference to FIG. 2. Around the layer 22 a sheath 24 of PVC has been molded. Two steel wires 25 are incorporated in the synthetic resin sheath. The flat cable shown in FIG. 3 can withstand strong external forces. For example, the axial pressure on the optical fiber of elements 23 is exhausted at a cable radius of 60 mm.

As such a cable radius is very small, a cable according to the invention can withstand strong external forces, which means, for example, that operators who lay the cable may jump on the cable or that bulldozers may drive over the cable without damage occurring to the optical fiber.

I claim:
1. An optical telecommunication element comprising:
 a central optical fiber;
 a layer of a cured lacquer surrounding the optical fiber and in contact therewith; and
 a close-fitting sheath of reinforcement fibers in the layer of cured lacquer, said reinforcement fibers having a minimum elasticity modulus of 4,000 kg/mm$^2$, said sheath being spaced from the central optical fiber by a thin sublayer of cured lacquer which fixes the optical fiber axially and radially within the sheath, said sheath and lacquer fixing the optical fiber under axial compression.

2. An optical telecommunication element as claimed in claim 1, characterized in that the lacquer is light-cured.

3. An optical telecommunication element as claimed in claim 2, characterized in that the sheath comprises at least two concentric shells of reinforcement fibers, said fibers occupying at least 70% of the volume of the sheath.

4. An optical telecommunication element as claimed in claim 3, characterized in that the reinforcement fibers occupy 80 to 88% of the volume of the sheath.

5. An optical telecommunication element as claimed in claim 3, characterized in that each reinforcement fiber bears against the adjoining fibers in the same shell and in adjacent shells.

6. An optical telecommunication element as claimed in claim 5, characterized in that the sheath comprises a first shell of 6 to 8 fibers, a second shell of 12 to 15 fibers and a third shell of 18 to 22 fibers, the fibers having diameters of 50 to 250 microns.

7. An optical telecommunication element as claimed in claim 1, characterized in that the axial compressive force on the optical fiber is 5 to 70 newtons.

8. A method of manufacturing an optical telecommunication element as claimed in claim 1, said method comprising the steps of:
   forming at least two reinforcement fibers into a sheath;
   applying a tensile stress to the sheath fibers;
   inserting an optical fiber centrally into the sheath;
   providing a curable lacquer having a maximum viscosity of 50 centipoises in the sheath between the fibers and contacting the optical fiber;
   curing the lacquer; and
   releasing the tensile stress so the sheath fibers apply an axial compressive stress on the optical fiber.

9. A method as claimed in claim 8, characterized in that the steps of forming the sheath, inserting the optical fiber, and providing a curable lacquer comprise:
   providing a reservoir containing a curable lacquer, said reservoir having an inlet and an outlet, said outlet having an inner diameter which corresponds to the outer diameter of the sheath; and
   passing the sheath fibers arranged around the central optical fiber through the lacquer and out the reservoir outlet, a layer of lacquer leaving the reservoir with the sheath and optical fiber.

10. A method as claimed in claim 9, characterized in that during passage through the reservoir, the sheath fibers are arranged in nested funnel-shaped shells around the optical fiber, each shell having a common axis and different apex angles.

11. An optical telecommunication cable comprising:
   at least one optical telecommunication element as claimed in claim 1; and
   an outer shell of synthetic resin provided around the optical telecommunication element.

* * * * *